(12) United States Patent
Stoyanov et al.

(10) Patent No.: US 12,528,180 B2
(45) Date of Patent: Jan. 20, 2026

(54) MOBILE ROBOT

(71) Applicant: Mobile Robot Technologies LLC, Wilmington, DE (US)

(72) Inventors: Stefan Stoyanov, Varna (BG);
Tsvetomir Varbanov, Varna (BG);
Daniel Bratanov, London (GB);
Rumyana Bratanova, London (GB);
Tihomir Todorov, Ruse (BG)

(73) Assignee: MOBILE ROBOT TECHNOLOGIES LLC, Wilmington, DE (US)

( * ) Notice: Subject to any disclaimer, the term of this patent is extended or adjusted under 35 U.S.C. 154(b) by 744 days.

(21) Appl. No.: 17/842,274

(22) Filed: Jun. 16, 2022

(65) Prior Publication Data

US 2022/0402115 A1  Dec. 22, 2022

Related U.S. Application Data

(60) Provisional application No. 63/211,852, filed on Jun. 17, 2021.

(51) Int. Cl.
*B25J 5/00* (2006.01)
*B62D 55/075* (2006.01)
*B62D 55/265* (2006.01)

(52) U.S. Cl.
CPC ............ *B25J 5/005* (2013.01); *B62D 55/075* (2013.01)

(58) Field of Classification Search
CPC ...... B62D 55/265; B62D 55/02; B62D 55/04; B62D 55/075; B62D 55/116; B62D 57/024; B25J 5/005; B60B 19/006; B60B 15/00; B60B 39/00

USPC ................ 180/901, 164, 9.32, 9.34; 280/755
See application file for complete search history.

(56) References Cited

U.S. PATENT DOCUMENTS

| | | | | | |
|---|---|---|---|---|---|
| 3,777,834 | A | * | 12/1973 | Hiraoka | H01F 7/20 D12/1 |
| 4,828,059 | A | * | 5/1989 | Naito | B62D 55/265 305/164 |
| 5,435,405 | A | * | 7/1995 | Schempf | B62D 55/265 901/44 |

(Continued)

FOREIGN PATENT DOCUMENTS

| | | | |
|---|---|---|---|
| CN | 108248710 A | * | 7/2018 |
| CN | 110435845 A | | 11/2019 |

(Continued)

OTHER PUBLICATIONS

CN 108248710, English translation (Year: 2018).*

(Continued)

*Primary Examiner* — Anne Marie M Boehler
(74) *Attorney, Agent, or Firm* — Crowell & Moring LLP

(57) ABSTRACT

A mobile robot may include a first track located on a first side of a robot body and a second track located on a second side of the robot body. The first track and the second track may be configured to cause movement of the robot body relative to a first surface. The mobile robot may also include a crutch. The crutch may have a crutch arm extending from a magnet base, where the crutch includes a crutch magnet secured to the magnet base, where the crutch arm is rotatable relative to the robot body about an axis, and where the magnet base is fixed relative to the crutch arm such that the crutch magnet moves when the crutch arm rotates about the axis.

19 Claims, 12 Drawing Sheets

FIG. 9

(56) References Cited

U.S. PATENT DOCUMENTS

| | | | | |
|---|---|---|---|---|
| 8,100,205 | B2* | 1/2012 | Gettings | ................ B62D 55/12 |
| | | | | 180/9.1 |
| 9,038,557 | B2 | 5/2015 | Smith | |
| 9,096,281 | B1* | 8/2015 | Li | ........................... B62D 55/04 |
| 9,180,934 | B2 | 11/2015 | Smith | |
| 9,440,717 | B2 | 9/2016 | Rooney, III et al. | |
| 12,065,207 | B1* | 8/2024 | Zhu | ...................... B62D 57/024 |
| 2013/0140801 | A1 | 6/2013 | Schlee et al. | |
| 2019/0210699 | A1 | 7/2019 | Jorgensen et al. | |
| 2024/0399790 | A1* | 12/2024 | Eto | ....................... B60B 19/006 |

FOREIGN PATENT DOCUMENTS

| | | | |
|---|---|---|---|
| CN | 209921453 U | | 1/2020 |
| CN | 110884585 A | | 3/2020 |
| CN | 113428248 A | * | 9/2021 |
| EP | 1924487 A1 | | 5/2008 |
| GB | 2544529 A | * | 5/2017 .............. B25J 5/005 |
| WO | WO 2007/025553 A1 | | 3/2007 |
| WO | WO 2020/200377 A1 | | 10/2020 |

OTHER PUBLICATIONS

CN 113428248, English translation (Year: 2021).*
Vodenicharov et al., "Underwater Hull Observation System Armus," Scientific Proceedings XIV International, Congress "Machines. Technologies. Materials,"2017—Summer Session, Year I, vol. V, pp. 319-322 (2017) (4 pages).
International Search Report and Written Opinion of the International Search Authority mailed Oct. 6, 2022 in International Application No. PCT/US2022/033931 (9 pp).
Extended European Search Report, dated Nov. 28, 2022, pp. 1-8, issued in European Application No. 22179191.6, European Patent Office, Munich, Germany.

* cited by examiner

MOBILE ROBOT

RELATED APPLICATION

This application claims the benefit of U.S. Provisional Application No. 63/211,852, filed Jun. 17, 2021, which is hereby incorporated by reference in its entirety.

TECHNICAL FIELD

The present disclosure relates to a mobile robot. More particularly, the present disclosure relates to a robot that is capable of traversing a surface having a material that is attracted to a magnetic force, such as a ferrous metal. One non-limiting example of such a surface is a hull surface of a marine vessel.

BACKGROUND

Hull management is an important activity in the commercial marine industry. The cleaning and inspection of hull surfaces is particularly important to prevent or remove marine growth. When the hull of a ship roughens due to the collection of marine build-up (i.e., bio-fouling), increased drag on the ship's hull can materially decrease the ship's efficiency and increase shipping costs. Increased drag may cause the ship's cruising speed to be reduced and fuel consumption may increase. This loss in performance may increase shipping costs and delay shipping dates, which ultimately harms the end consumer.

Regular cleaning of the marine vessel is also important for environmental reasons. For example, certain environmental regulations (current and anticipated) require the removal of marine growth to prevent foreign aquatic species from invading non-natural habitats, for the protection of coral reefs and other aquatic ecosystems, etc.

One method of cleaning hull surfaces, and particularly underwater surfaces, involves manual cleaning using human divers. While this can be successful, divers are inefficient, expensive, and often subjected to hazardous underwater conditions. Another solution involves the use of a mobile apparatus, such as a mobile robot, that is movable along the hull surface for cleaning and/or inspection. While such devices have been tested with some success, existing mobile cleaning and inspection apparatus lack sufficient mobility to reach all desired areas of the marine vessel.

In view of this background, the present disclosure relates to a mobile robot with improved mobility.

BRIEF DESCRIPTION OF THE DRAWINGS

Certain features, aspects, and advantages of the disclosed embodiments are shown in the drawings accompanying this description. The drawings are briefly described below.

DETAILED DESCRIPTION

Figure 1:
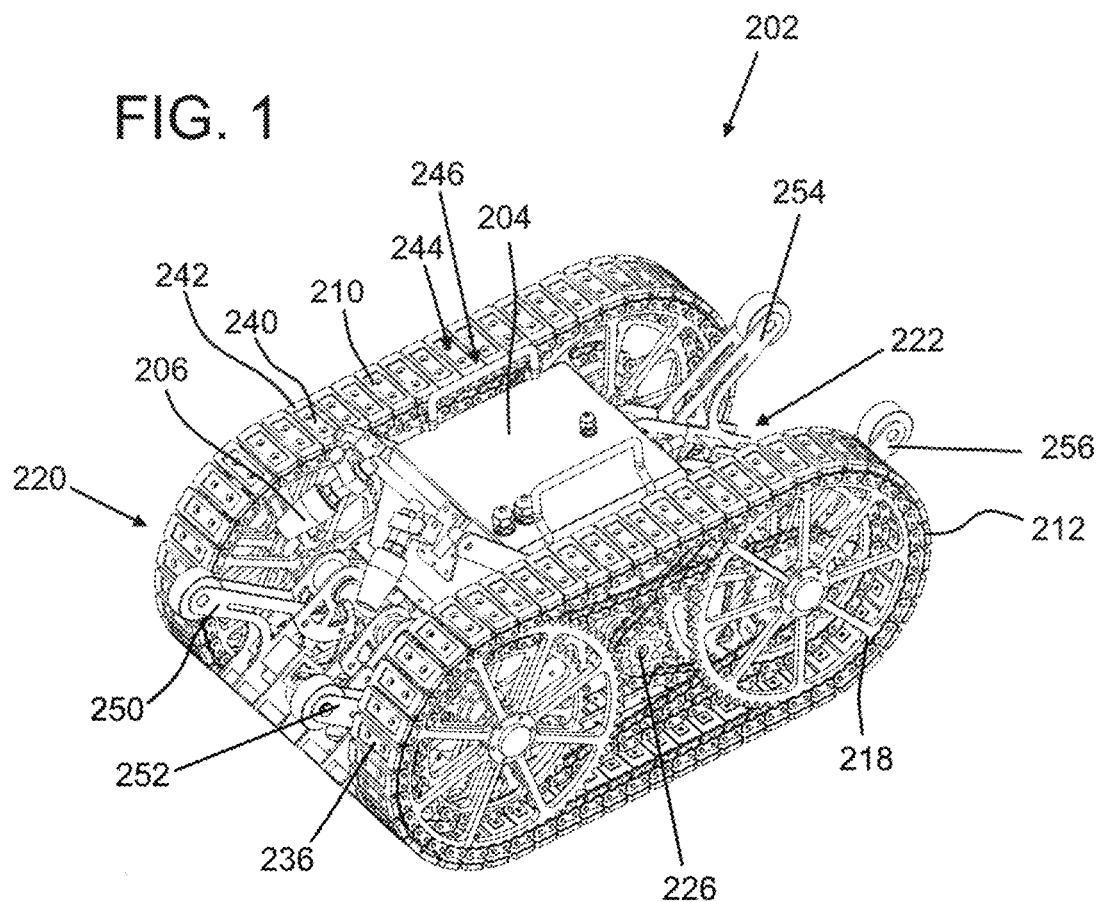
FIG. 1 is an illustration showing a perspective view an embodiment of a mobile robot in accordance with certain aspects of the present disclosure.

The present embodiments are described with reference to the drawings in which like elements are referred to by like numerals. The relationship and functioning of the various elements of this invention are better understood from the following detailed description. However, the embodiments of the invention are not limited to the embodiments illustrated in the drawings. It should be understood that in certain instances, details have been omitted which are not necessary for an understanding of the present invention, such as conventional fabrication and assembly.

In general, the described embodiments relate to a mobile robot for marine applications, particularly for inspecting and/or cleaning hull surfaces of a marine vessel and/or cargo holds. One example of such a mobile robot 202 is shown in FIG. 1. The mobile robot 202 may be remote-controlled, automatically controlled (e.g., with artificial intelligence or another control system), and/or may be connected to a controller via a cable. The mobile robot 202 may include sensors or cameras 206 for inspection of a hull surface, for example, along with transmission equipment (wireless or wired) to provide information to a remote operator. Since the mobile robot 202 may be capable of navigating a variety of hull surfaces (as discussed in more detail below), the mobile robot 202 may reduce or eliminate the need for human divers to perform certain hull inspection and cleaning tasks. Additionally or alternatively, an embodiment of a mobile robot may be outfitted with cleaning equipment to perform a cleaning task or other hull/cargo hold maintenance task without manual human intervention.

While other applications and functionalities are not discussed in detail, certain aspects of the mobile robots discussed herein may be applicable to other marine-related functions and/or applications extending beyond marine technology. For example (and without limitation), the ability of the described mobile robot to move from one surface to another, and the apparatuses and methods that enable this ability, may be useful in many marine applications (submerged or not) along with countless other applications.

FIGS. 1-6 show various views of the mobile robot 202, which is primarily configured for inspecting a hull surface of a marine vessel. The mobile robot 202 may generally include a robot body 204 located between two endless, continuous tracks: a first track 210 and a second track 212. The robot body 204 may be outfitted with a variety of devices for cleaning and inspection, such as a set of cameras 206. The robot body 204 may also house one or more actuators (e.g., for providing driving force(s) for moving the mobile robot 202 and/or operating various cleaning equipment or other tools), an electronic system for operating a control system and/or a remote-control transmitter for sending signals to and receiving signals from an external computer, sensors and other monitoring devices, etc.

The first track 210 and the second track 212 may be the primary apparatus causing movement of the mobile robot 202. The first track 210 may be located on a first side of the robot body 204 and a second track 212 may be located on a second side of the robot body 204. In exemplary embodiments, the first track 210 and the second track 212 are separately operable. For example, to turn/rotate the mobile robot 202, the first track 210 may be operated at a different speed than the second track 212, or one of the first track 210 and the second track 212 may be operated in the forward direction while the other operates in reverse.

Figure 2:
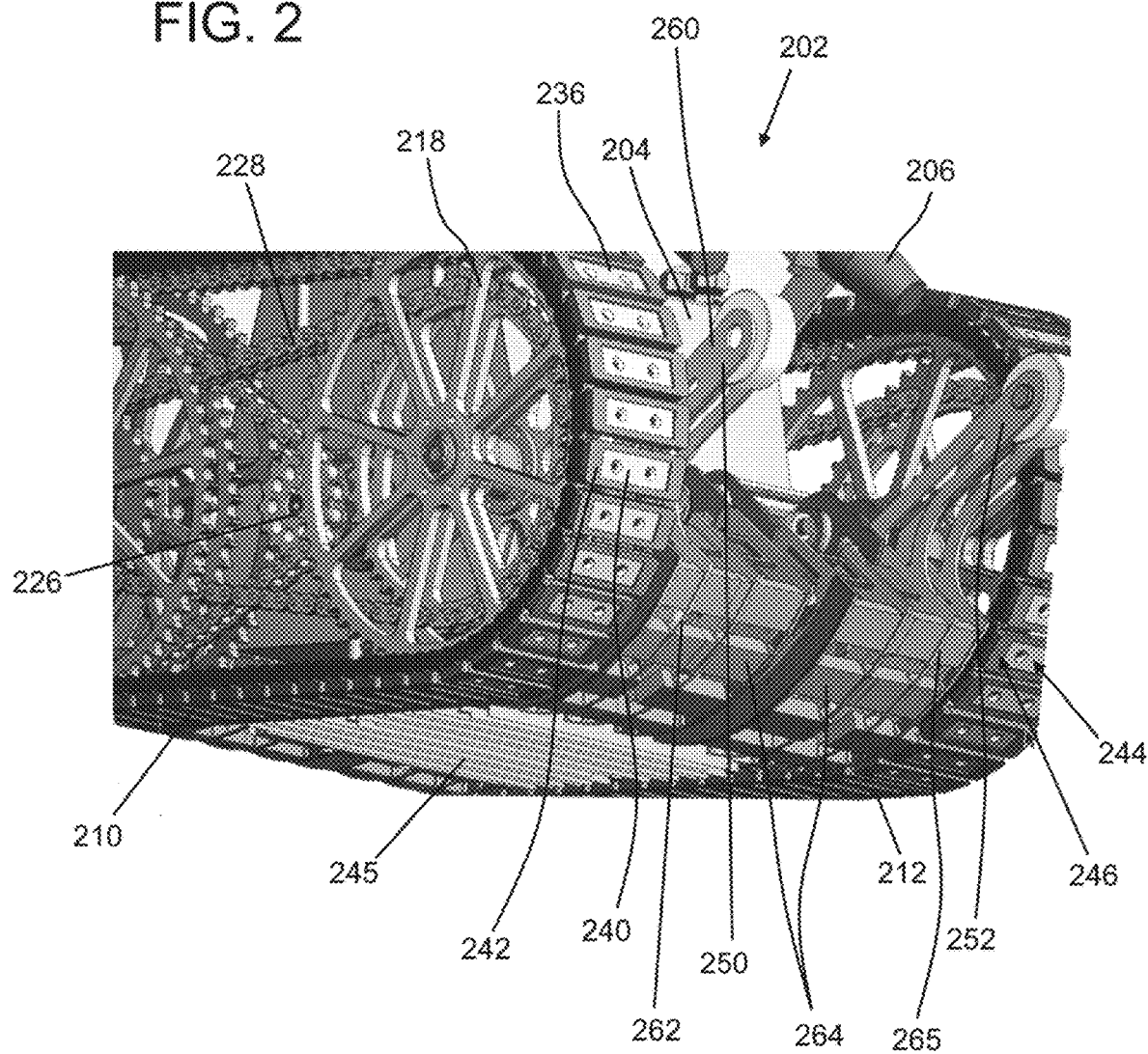
FIG. 2 is an illustration showing a perspective view of the mobile robot from FIG. 1.

The first track 210 and the second track 212 may each be in mechanical communication with a set of wheels 218, where at least one of the wheels 218 is driven by an actuator to cause cycling of the tracks. As shown by FIG. 2, each of the first track 210 and the second track 212 engages four wheels: two wheels in the front 220 of the mobile robot 202 and two wheels in the back 222. This feature may be advantageous for creating a durable and well-aligned drive configuration without using an unnecessarily large single wheel. Further, since this arrangement limits the area of engagement between the tracks and wheels relative to other arrangements, the relative likelihood of debris being lodged between the wheels 218 and the tracks 210, 212 is reduced. Utilizing spoked wheels, as shown, may enhance this advantage (e.g., since additional leeway is provided for potential debris).

Figure 3:
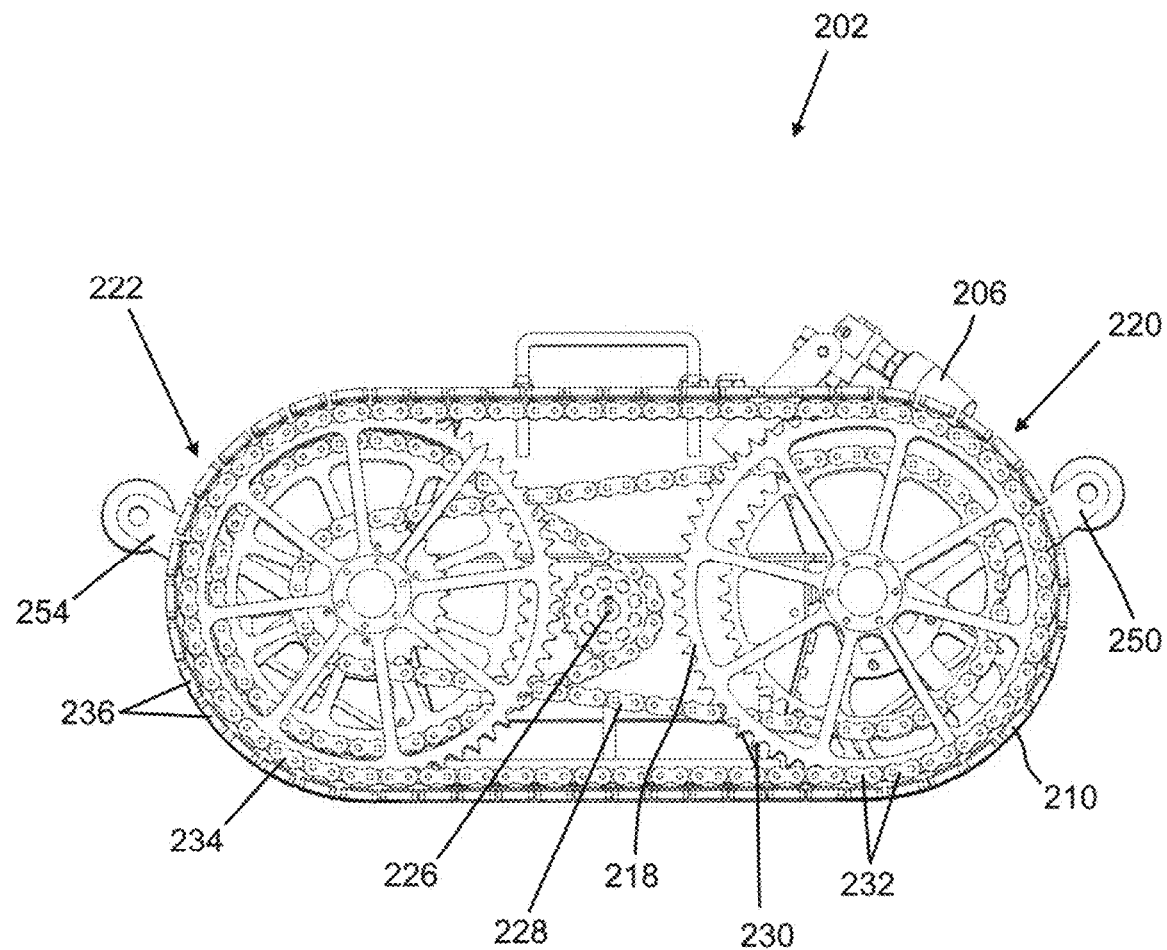
FIG. 3 is an illustration showing a side view of the mobile robot from FIG. 1.
Figure 12:
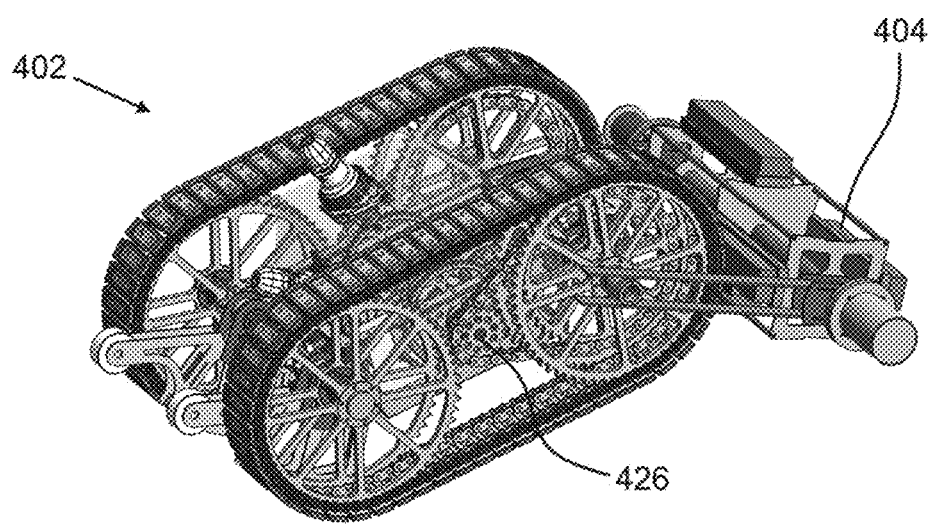
FIG. 12 is an illustration showing a perspective view another embodiment of a mobile robot in accordance with certain aspects of the present disclosure.

While many suitable drive system configurations are contemplated, the illustrated example relies on a driven central shaft 226 as shown in FIG. 3 (e.g., where the central shaft is rotated by an actuator, such as an electric or hydraulic motor). Torque from the driven central shaft 226 is transferred to the wheels 218, and ultimately the first track 210 and the second track 212, via various belts or chains 228. As shown, the chains 228 may mechanically communicate with gearwheels of various diameters to optimize the torque and/or rotational speed of the tracks 210,212. Optionally, additional components may be driven by the driven central shaft 226. For example, referring to FIG. 12, a rotatable brush 404 may be mechanically coupled to, and driven by, a similar central shaft 426.

Referring to FIGS. 1-7, the first track 210 and the second track 212 may be secured to the wheels 218 via engagement between wheel teeth 230 (FIG. 3) and linkages 232 (FIG. 3) of a track chain 234 (FIG. 3). An outer portion of the track chain 234 may be secured to a set of track links 236, which form an interface between the mobile robot 202 and the hull surface.

Figure 4:
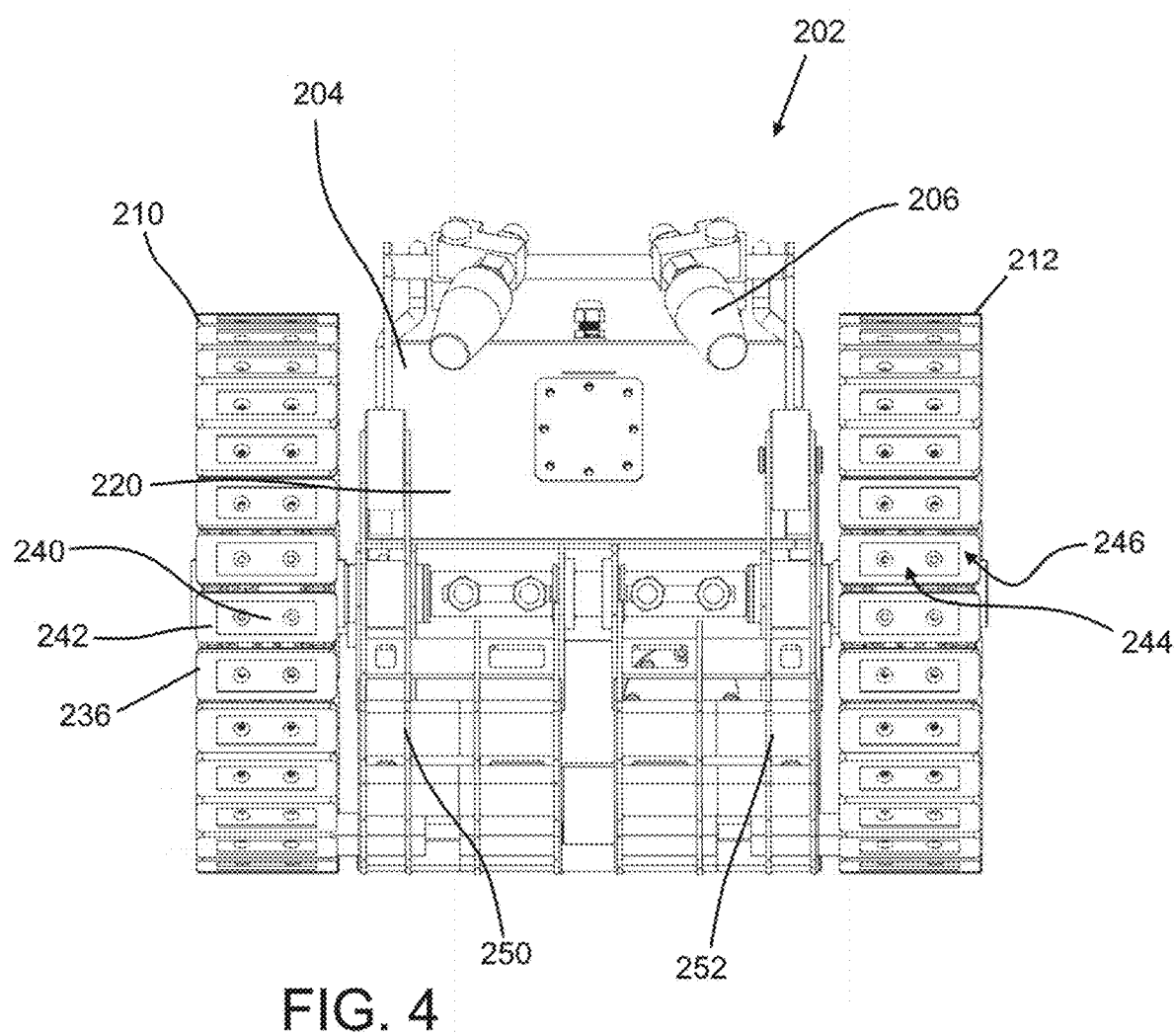
FIG. 4 is an illustration showing a front view of the mobile robot from FIG. 1.
Figure 5:
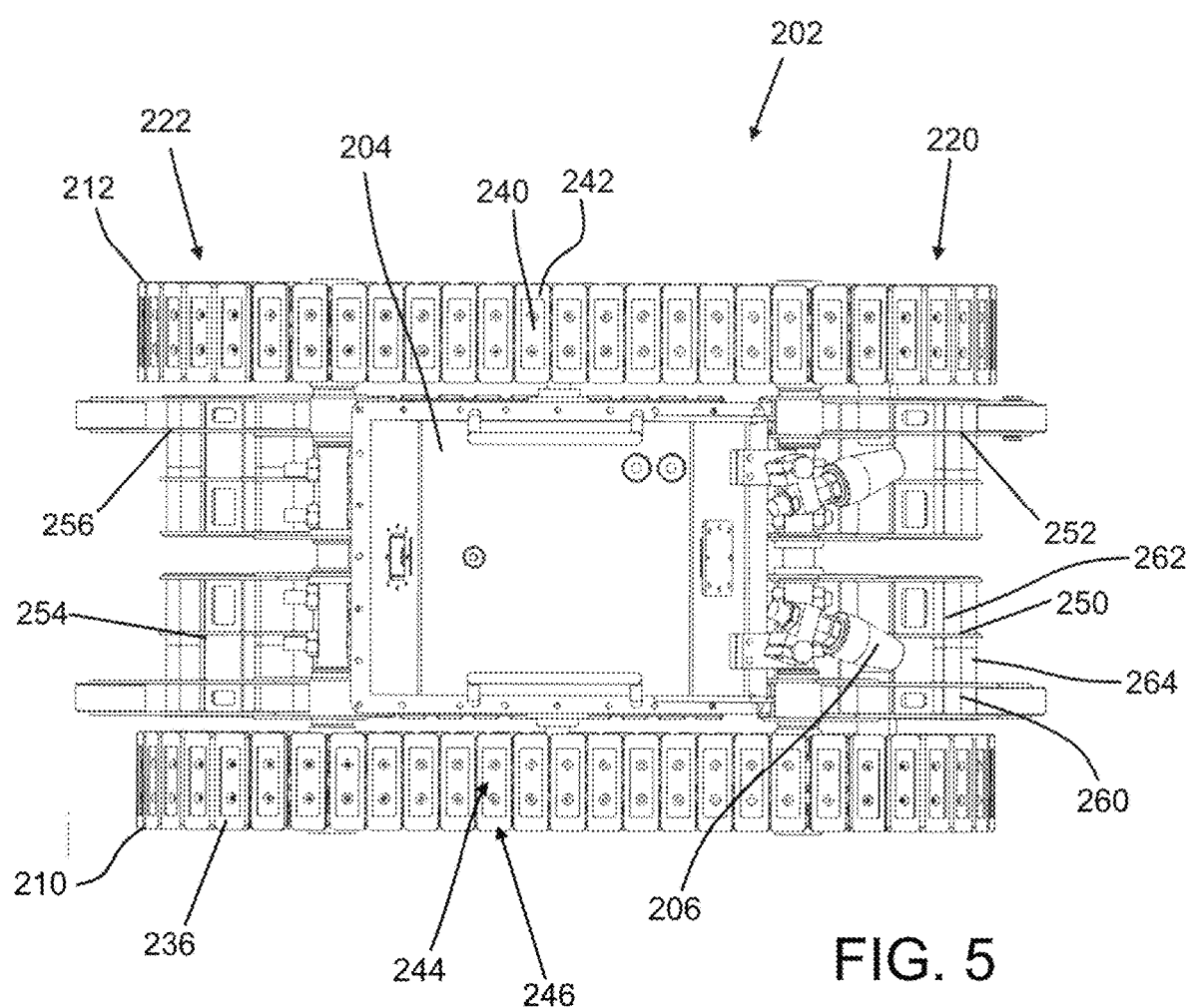
FIG. 5 is an illustration showing a top view of the mobile robot from FIG. 1.

When operating on a surface that includes a ferrous metals (which is typical for a ship hull), it may be advantageous for the track links 236 to each include a track magnet 240. The track magnets 240 may be any suitable permanent magnet (and it is contemplated that an electromagnet may be used). For example, the track magnets 240 may be rare-earth magnets (e.g., neodymium magnets or samarium-cobalt magnets), which may form magnetic fields significantly stronger than common ferrite or alnico magnets. As shown in FIG. 4, each track magnet 240 may be at least partially surrounded by a magnet enclosure 242. The magnet enclosures 242 may be formed of any suitable material, such as rubber or plastic. Advantageously, the magnet enclosures 242 may prevent direct contact between the track magnets 240, which is particularly advantageous when using rare-earth magnets that have a tendency to be brittle and vulnerable to corrosion. The magnet enclosures 242 may fully surround the track magnets 240, but in the depicted example, face surfaces 244 of the track magnets 240 are left bare.

In some embodiments, the face surface 244 of each of the track magnets 240 may be slightly depressed relative to an adjacent face surface 246 of the magnet enclosures 242. When the mobile robot 202 drives over a hull surface, this slight depression may allow the track magnets 240 to remain relatively close to the hull surface (e.g., about three millimeters or less for sufficient magnetic attraction), but direct contact between the track magnets 240 and the hull surface may be prevented (thereby limiting wear and damage to the track magnets 240 experienced during normal operation).

Figure 6:
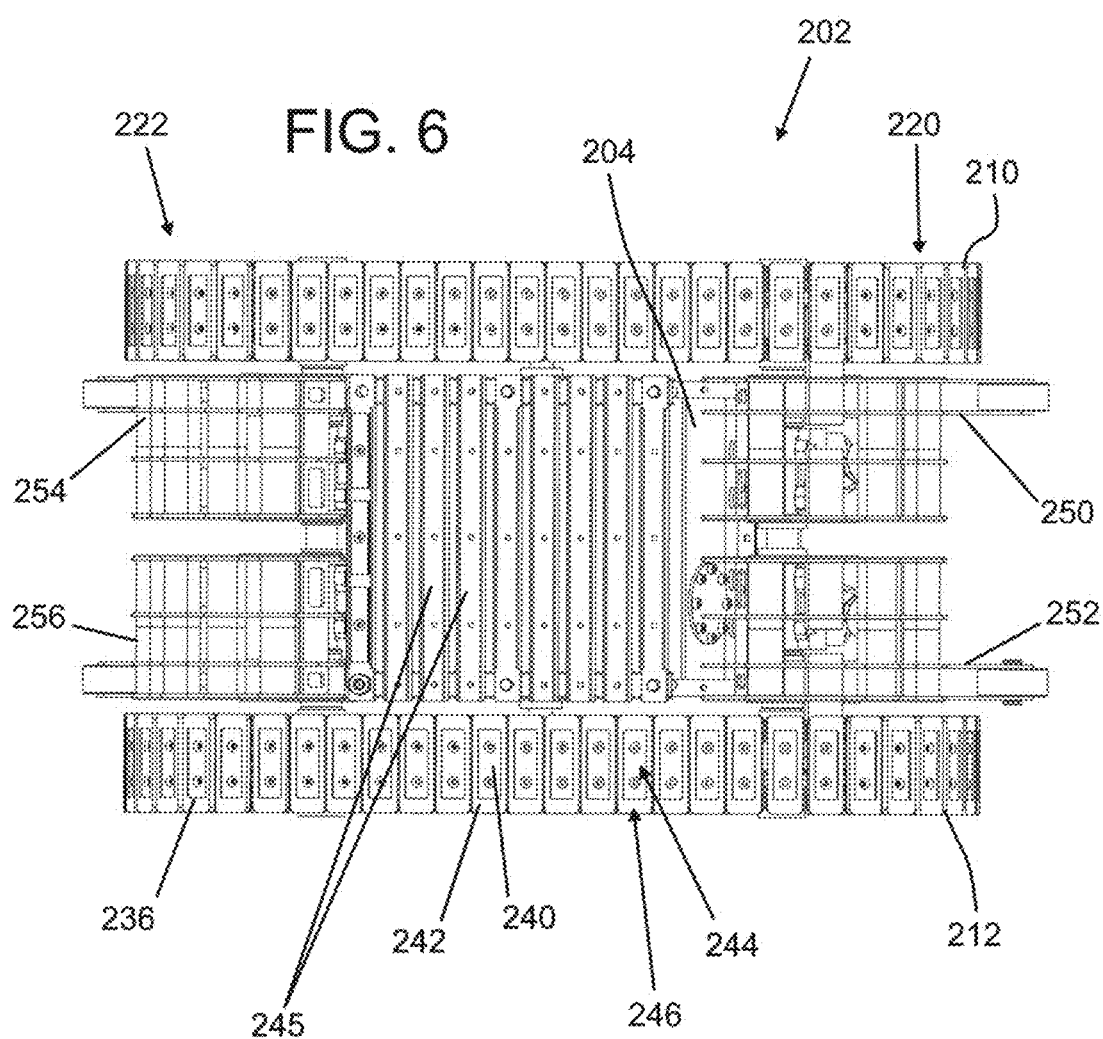
FIG. 6 is an illustration showing a bottom view of the mobile robot from FIG. 1.

When the mobile robot 202 is engaged with a hull surface, the track magnets 240 may be magnetically attracted to the hull surface with sufficient force such that the mobile robot 202 remains engaged with the hull surface throughout a variety of conditions. For example, the magnetic attraction force between the track magnets 240 and the hull surface may allow the mobile robot 202 to traverse, with sufficient traction, any angled or inverted surface (even completely upside-down), lubricious surfaces (e.g., due to buildup of alga), surfaces with discontinuities such as bumps or cracks and/or other obstacles (including shells or other bio-fouling), etc. In some embodiments (and as shown in FIG. 6), additional undercarriage magnets 245 may be utilized to provide additional downforce on the mobile robot 202. In some aspects, the undercarriage magnets 245 may extend along an entirety of a flat portion of the robot body 204 and/or along a curved profile on the front side 220 and back side 222 of the robot body 204. The undercarriage magnets 245 may be very close (e.g., a few millimeters) from the outer perimeter profile of the tracks such that they are in close proximity from an underlying surface, for example. Like the track magnets 240, the undercarriage magnets 245 may be permanent magnets formed with rare-earth elements, but other types of permanent magnets (or electromagnets) can alternatively be used.

To facilitate movement from one hull surface to another (as depicted in FIGS. 8-11 for example), one or more crutches may be included. As shown in FIG. 2 and FIG. 3, a first crutch 250 and a second crutch 252 are located on the front side 220 of the mobile robot 202, and two similar crutches (a third crutch 254 and a fourth crutch 256) are located on the back side 222 of the mobile robot 202. As discussed in greater detail below, the crutches may be advantageous for allowing the mobile robot 202 to move from one hull surface to another, such as from a floor surface to a wall surface (or vice versa), from a wall surface to a ceiling surface (or vice versa), or any other suitable surfaces that converge. Since the mobile robot 202 includes crutches on both its front 220 and back 222 (which may be interchangeable), mobility may be further enhanced since the mobile robot's ability to switch surfaces does not depend on the direction of travel. Further, in certain embodiments, each crutch may be operable independently (e.g., the first crutch 250 may be movable relative to the second crutch 252), which may allow the mobile robot 202 to switch from one surface to another, such as from a floor surface to a wall, even when approaching the wall at an angle.

Referring to FIG. 2, the first crutch 250 may generally include a crutch arm 260 that is fixed relative to a magnet base 262. The crutch arm 260 may extends beyond an outer perimeter profile of the first track 210. In FIG. 2, for example, the magnet base 262 of the first crutch 250 may secure a plurality of crutch magnets 264 along the curved profile 265. The depicted crutch 250 includes four separate rows of crutch magnets 264 (e.g., each row having two magnets), but other arrangements are alternatively contemplated depending on the magnetic strength and size of the crutch magnets 264, the weight of the mobile robot 202, the material of the hull, etc. The curved profile 265 (FIG. 2) may generally follow the profile of the first track 210, as shown. Additionally, the curved profile 265 may extend along an arc that is equidistance from the axis of rotation of the crutch 250, which may be advantageous for such that each of the crutch magnets 264 follow the same path during rotation.

Figure 7:
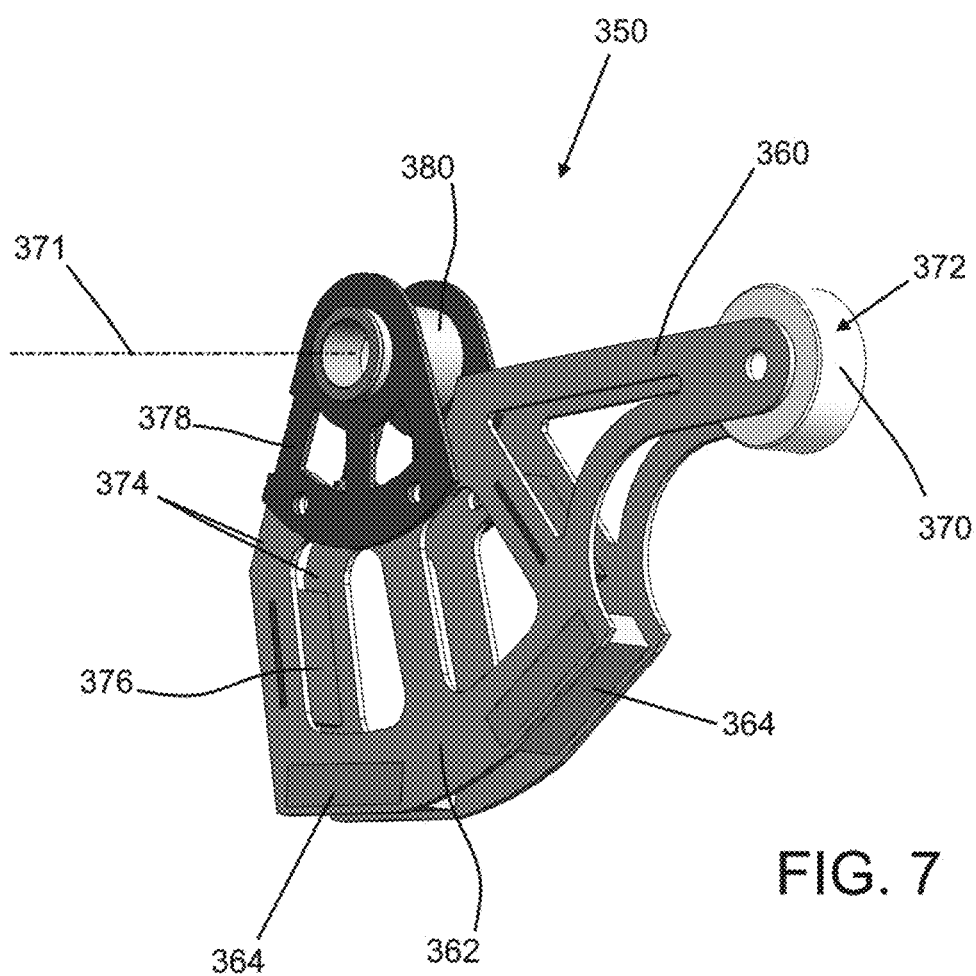
FIG. 7 is an illustration showing a crutch for use in a mobile robot in accordance with certain aspects of the present disclosure.

FIG. 7 shows an embodiment of a crutch 350 in isolation. Notably, the crutch 350 differs from the crutches of FIGS. 2-6 in that it includes less crutch magnets (for simplicity of explanation). In particular, the crutch 350 includes only two crutch magnets 364 (as opposed to many more crutch magnets 264 as shown in FIG. 2), and it is contemplated that any suitable number of crutch magnets 364 may be included. As shown, the crutch 350 includes a crutch arm 360 extending from a magnet base 362. The crutch arm 360 may generally extend radially from an axis 371. The crutch arm 360 may be fixed to the magnet base 362 such that when the crutch arm 360 moves, the magnet base 362 also moves. In particular, the crutch arm 360 and the magnet base 362 may be rotatable about the axis 371, which optionally is the axis of rotation of one or more wheels of the mobile robot. As described in more detail below, when the crutch arm 360 is subjected to an input force (e.g., via contact with a surface of a hull), the crutch arm 360 may be caused to rotate about the axis 371, thereby rotating the magnet base 362 to alter the direction of magnetic force caused by the crutch magnets 364.

Optionally, a roller 370 may be coupled to the crutch arm 360 at a terminal end of the crutch arm 360 such that the roller 370 forms a portion of the crutch 350 furthest from the axis 371. The roller 370 may include a contact surface 372, which may be the leading surface of the crutch 350 as the mobile robot approaches a wall. Inclusion of the roller 370 may be advantageous to reduce friction between the crutch 350 and a respective surface.

The crutch 350 may be formed with any suitable construction. For example, the crutch 350 of FIG. 7 is generally formed with two crutch panels 374, which are mirror images of each other. The crutch panels 374 are spaced from each other via a set of spacers 376, which may be advantageous for ensuring the crutch magnets 364 are fully engaged with the crutch panels 374, for example. Other components may additionally or alternatively connect the crutch panels, such as the roller 370, the crutch magnets 364 themselves, or any other suitable device. One or both of the crutch panels 374 may be coupled to a bracket 378, which may act as an interface between the crutch 350 and shaft or other elongated body extending along the axis 371 (such as the shaft 271 shown in FIG. 3). An optional collar 380 may be included to connect the bracket 378 to the shaft, as shown.

In other embodiments (and referring to FIG. 2), the magnet base 262 may be substantially wider than the crutch arm 260. As shown in FIG. 2, the width of the magnet base 262 may cover approximately half of the width of the robot body 204 (where the other half is covered by the magnet base of the second crutch 252), which may be advantageous for increasing the magnet size (and thus the total magnet force) relative to other embodiments. The profile 265 of the magnet base 262, which may generally extend along an arc (equidistance from the rotational axis), may cover at least about 20 degrees, such as about 30 degrees in the depicted example (and other angular coverages are also contemplated). The crutch magnets 364 may be coextensive with the majority of this profile 265 (e.g., from a front perspective). This profile 265 of the magnet base 262 may be substantially parallel to a profile formed by a curved portion 267 of the first track 210. Advantageously, this arrangement may ensure that crutch magnets 264 remain in close proximity to an underlying surface through the crutch's rotation.

FIGS. 8-11 illustrate an example of operation of the crutch 350 (and a rear crutch 354), where a mobile robot 302 moves from a first surface 382 to a second surface 384. One or both of the first and second surfaces may include a ferrous material for magnetic attraction, and they may be hull surfaces of a marine vessel, for example.

Figure 8:
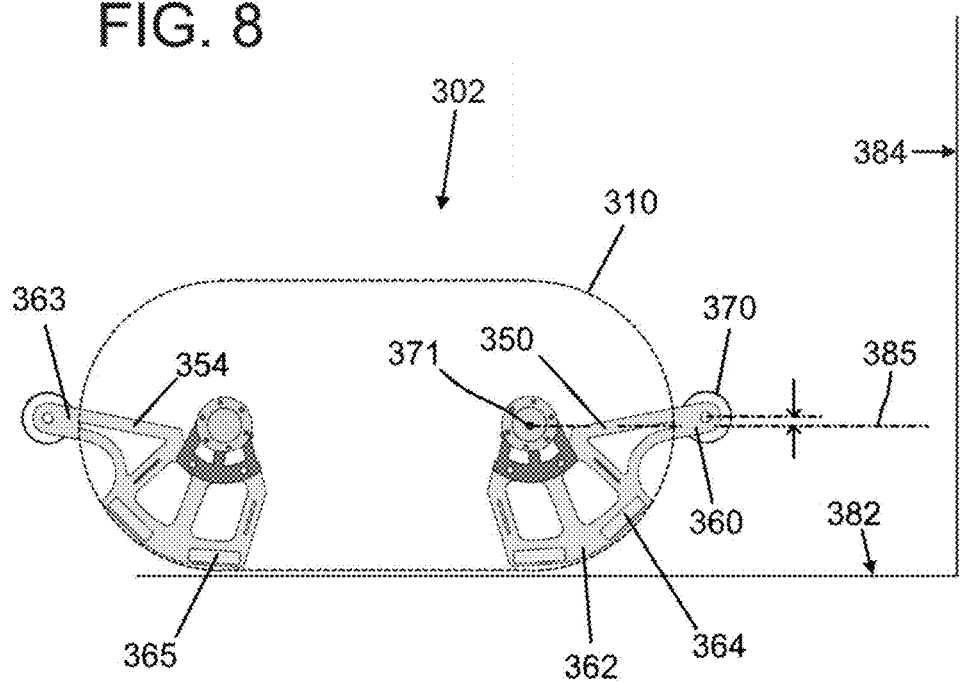
FIG. 8 is an illustration showing a mobile robot with front and back crutches as it approaches a vertical wall surface in accordance with certain aspects of the present disclosure.

In FIG. 8, the mobile robot 302 is depicted as moving along a first surface 382. In particular, the track 310 is in direct engagement with (e.g., i.e., in contact with) the first surface 382 such that the mobile robot 302 is movable along the first surface 382 as the track 310 revolves. Track magnets within the track 310 may be primarily responsible for engagement between the track 310 and the first surface 382, but other magnets may also have an affect such as the above-described undercarriage magnets and/or the crutch magnets 364.

The crutches 350, 354 may be in a default position relative to the body of the mobile robot 302. In particular, the crutch arm 360 of the front crutch 350 may extend in the direction of motion of the mobile robot 302 such that the roller 370 forms a leading portion of the mobile robot 302. The terminal end of crutch arm 360, which includes the roller 370, may be suspended away from the first surface 382. More specifically, in this default position, the terminal end of the crutch arm 360 may be offset relative to a plane 385 passing through the axis 371 and parallel to the first surface 382, which may ensure that a torque on the crutch arm 360 is formed on the crutch arm 360 to thereby rotate the crutch arm 360 when contact is initiated between the roller 370 and the second surface 384. The crutch arm 360 may be influenced into this default position by any suitable device, such as by attraction between the crutch magnets 364 and the first surface 382 or a spring or contact limiter, by weight distribution of the crutch, etc. The tendency for the crutch arm 360 to assume this default orientation relative to the track 320 may occur even when the mobile robot 302 is on a vertical surface, upside-down surface, etc.

Similarly, the crutch arm 363 of the rear crutch 354 may extend in substantially the opposite direction in its default state, in this case opposite of the direction of movement of the mobile robot 302. As mentioned above, the crutch magnets 364, 365 may be positioned such that they are relatively close to the first surface 382 (causing an attraction between the first surface 382 and the crutch magnets 364), thereby providing a downforce on the mobile robot 302 to facilitate suitable engagement between the track 310 and the first surface 382, and also to cause a tendency for the crutches 350, 354 to remain in their default state.

Figure 9:
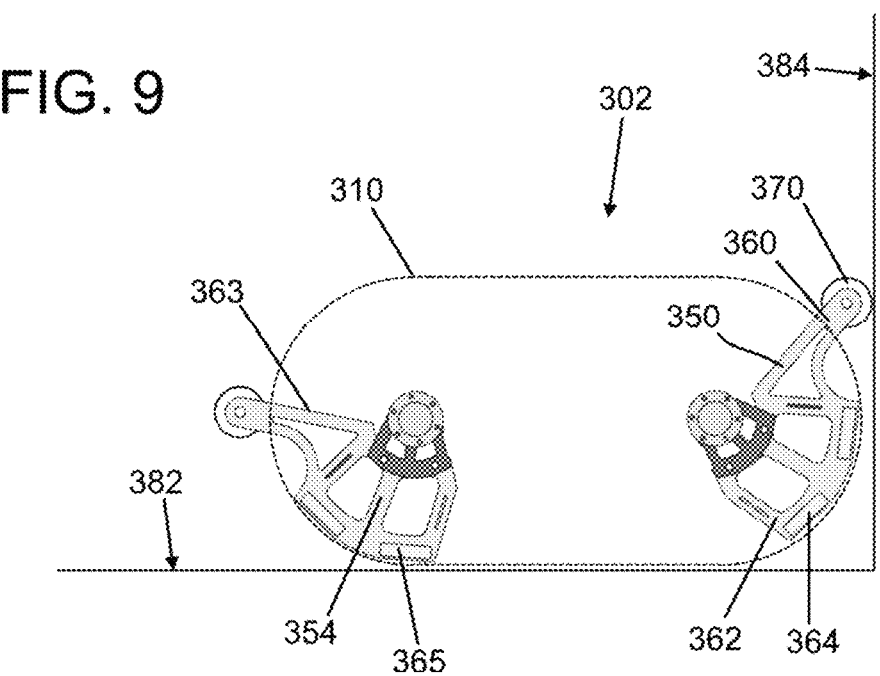
FIG. 9 is an illustration showing the mobile robot of FIG. 8 as the mobile robot initiates engagement with the vertical wall surface in accordance with certain aspects of the present disclosure.

FIG. 9 shows the mobile robot 302 after contact is initiated between the second surface 384 and the roller 370 of the front crutch 350. As shown, the second surface 384 is angled 90 degrees relative to the first surface 382. Other angles are also contemplated. For example, mobile robot 302 may be capable of moving from two surfaces, such as between floor, wall, and ceiling surfaces, which are angled up to at least 100 degrees (or greater).

In the position depicted by FIG. 9, the contact surface (roller 370) has engaged the second surface 384, and continued movement of the mobile robot 302 towards the second surface 382 has displaced the front crutch 350 relative to the body of the mobile robot 302. In particular, contact between the front crutch 350 and the second surface 382 has caused the crutch arm 360 to rotate in the counterclockwise direction from the perspective of FIG. 9. Since the magnet base 362 is fixed relative to the crutch arm 360, this rotation of the crutch arm 360 in turn caused the magnet base 362 to rotate, thereby moving the crutch magnets 364 towards the second surface 384. As a result, at least one of the crutch magnets 364 may be sufficiently close to the second surface 384 such that the magnetic flux between the crutch magnets 364 and the second surface 384 causes material attraction between the mobile robot 302 and the second surface 384. This attraction increases exponentially as the distance between the second surface 384 and the crutch magnets 364 decreases. When the mobile robot 302 is close enough such that the track 310 contacts the second surface 384, the total attraction force between the second surface 384 and the mobile robot 302 may be sufficient to counteract gravity as the mobile robot 302 begins to climb the second surface 384. Thus, as shown in FIG. 10, the mobile robot 302 may remain engaged to the second surface 384 during the transition phase as it moves from the first surface 382 to the second surface 384.

Figure 10:
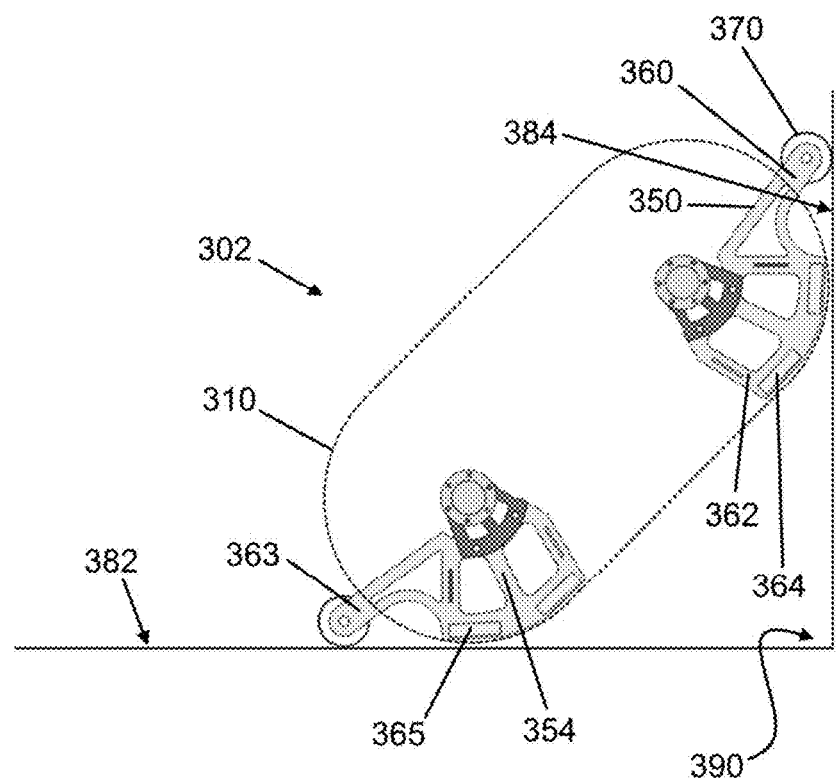
FIG. 10 is an illustration showing the mobile robot of FIG. 8 as the mobile robot transitions from a horizontal floor surface to the vertical wall surface in accordance with certain aspects of the present disclosure.
Figure 11:
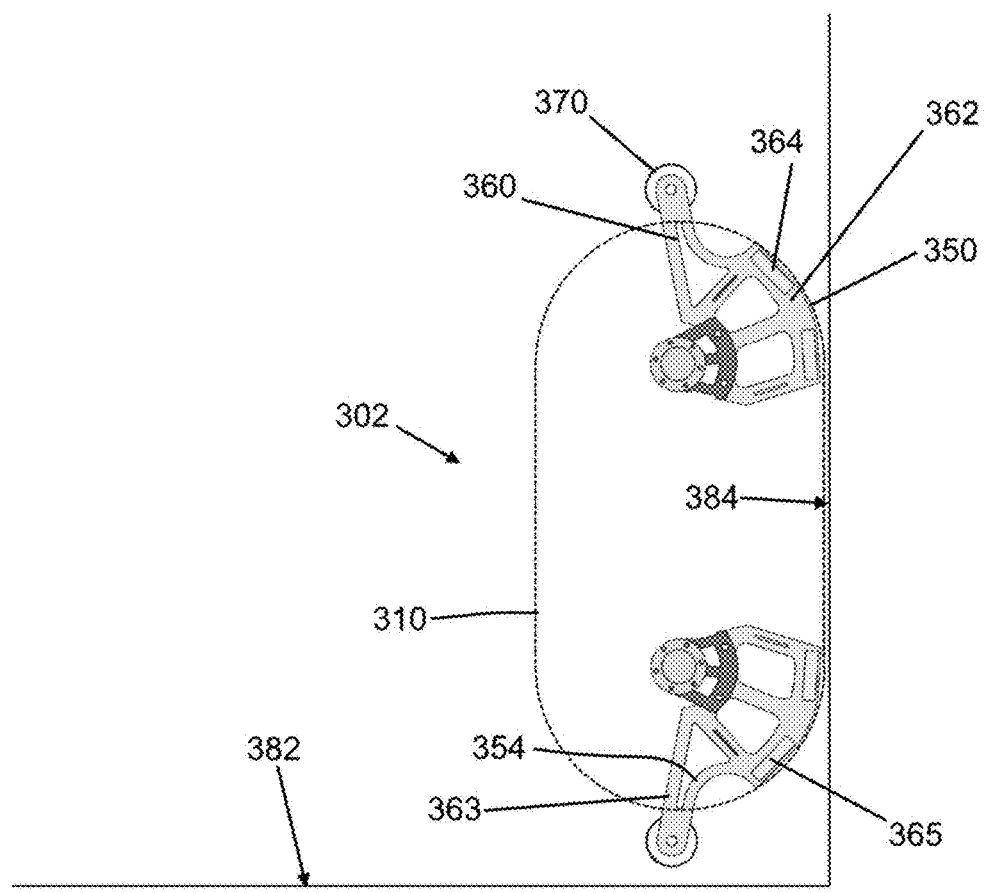
FIG. 11 is an illustration showing the mobile robot of FIG. 8 when the mobile robot is fully engaged with the vertical wall surface (and has unengaged the horizontal floor surface) in accordance with certain aspects of the present disclosure.

Referring to FIG. 10, when the mobile robot 302 is transitioning between the first surface 382 and the second surface 384, both the front crutch 350 and the rear crutch 354 may contact respective surfaces such that their respective crutch magnets ensure the mobile robot 302 remains engaged with the hull during this transition. For example, as the body of the mobile robot 302 rotates into its new orientation, the rear crutch 354 may eventually contact the first surface 382 causing the crutch magnets of the rear crutch 354 to rotate towards, or remain facing, the first surface 382. Advantageously, this action of the rear crutch 354 may ensure the mobile robot 302 remains sufficiently aligned and/or otherwise engaged with the first surface 382 until full engagement with the second surface 384 is complete. This is particularly advantageous because overall magnetic force exerted by the track magnets in this orientation may not be sufficient (i.e., since most of the track 310 is suspended above a corner 390 and not in close proximity with a ferrous surface). Once the robot is fully engaged with the second surface 384 (as shown in FIG. 11), direct contact between mobile robot 302 and the first surface 382 may cease, and the mobile robot 302 may climb the second surface 384.

In some examples, a mobile robot may incorporate certain aspects described above and also include one or more tools for hull or cargo hold maintenance, or other utilities for a different surface type. For example, the mobile robot 402 depicted in FIG. 12 may include a brush 404 for abrasive mechanical cleaning and/or other cleaning equipment (such as a high-pressure water jet, a bristled brush, a rigid scraper, etc.). The brush 404 may be independently operable, and/or may be powered by the same actuator that controls the tracks. For example, a central shaft 426 may be mechanically couple to the brush 404 such that it can selectively cause active operation of the brush 404. Other suitable embodiments of brushes and other surface-cleaning equipment (or other equipment types) are also contemplated.

While not shown in the figures, it is also contemplated that the crutches may lack magnets and simply be used as guides for initially aligning the mobile robot as it approaches a vertical surface. In such an embodiment, the track magnets and/or undercarriage magnets may be sufficient to transfer the mobile robot from one surface to another without the need for crutch magnets.

Having described various aspects of the subject matter above, additional disclosure is provided below that may be consistent with the claims originally filed with this disclosure. In describing this additional subject matter, reference may be made to the previously described figures.

A first general aspect includes a mobile robot. The mobile robot may include one or more of the following: a robot body; a first track located on a first side of the robot body and a second track located on a second side of the robot body, where the first track and the second track are configured to cause movement of the robot body relative to a first surface; and a first crutch. The first crutch may include a crutch arm extending from a magnet base, where the first crutch includes a crutch magnet secured to the magnet base, where the crutch arm is rotatable relative to the robot body about an axis, and where the magnet base is fixed relative to the crutch arm such that the crutch magnet moves when the crutch arm rotates about the axis.

Implementations of the first general aspect may include one or more of the following features. The magnet base may include an arced profile that is parallel to a profile formed by a curved portion of the first track, where the crutch magnet moves along the arced profile when the crutch arm rotates. An end of the crutch arm may have a roller configured to contact a second surface, the second surface being angled relative to the first surface. Contact between the second surface and the roller may cause rotation of the crutch arm about the axis. The mobile robot may further include a second crutch that is rotatable about the axis, where the first crutch is adjacent to the first track, where the second crutch is adjacent to the second track, and where the first crutch is rotatable relative to the second crutch such that the first crutch and the second crutch are independently operable. In another implementation, the first crutch is located on a front side of the mobile robot, and a second crutch is located on a rear side of the mobile robot. At least one undercarriage magnet may be located on a bottom surface of the robot body and fixed relative to the robot body. At least one of the first track and the second track may include a plurality of track magnets included within track linkages. A contact surface of the crutch arm may be offset relative to a plane extending through the axis and parallel to the first surface, such that contact between a second surface and the contact surface causes a torque on the crutch arm about the axis.

A second general aspect includes another implementation of a mobile robot, the mobile robot including: a robot body; a first track located on a first side of the robot body and a second track located on a second side of the robot body, where the first track and the second track are configured to cause movement of the robot body relative to a first surface, where the first track includes a plurality of linkages mechanically coupled to an actuator, where at least one of the linkages includes a track magnet for causing an attraction between the first track and the first surface; and a first crutch, where the first crutch includes a crutch arm that extends beyond an outer perimeter profile of the first track.

Implementations of the second general aspect may include one or more of the following features. The track magnet may be at least partially covered by a magnet enclosure, where a face of the track magnet is depressed relative to an adjacent face surface of the magnet enclosure. The face of the track magnet may be exposed on an outer perimeter of the first track. An end of the crutch arm may have a roller configured to contact a second surface, the second surface being angled relative to the first surface. Contact between the second surface and the roller may cause rotation of the crutch arm relative to the robot body. The first crutch and a second crutch may be rotatable about an axis, where the first crutch is adjacent to the first track, where the second crutch is adjacent to the second track, and where the first crutch is rotatable relative to the second crutch such that the first crutch and the second crutch are independently operable. At least one undercarriage magnet may be located on a bottom surface of the robot body.

A third general aspect includes another implementation of a mobile robot. The mobile robot may include: a robot body; a first track located on a first side of the robot body and a second track located on a second side of the robot body, where the first track and the second track are configured to cause movement of the robot body relative to a first surface; a first crutch and a second crutch located on a front side of the mobile robot; and a third crutch and a fourth crutch located on a back side of the mobile robot, where each of the first crutch, the second crutch, the third crutch, and the fourth crutch includes a crutch arm that extends beyond an outer perimeter profile of the first track and the second track.

Implementations of the third general aspect may include one or more of the following features. Each of the first crutch, the second crutch, the third crutch, and the fourth crutch may have at least one crutch magnet that is fixed to the respective crutch arm. Each of the first crutch, the second crutch, the third crutch, and the fourth crutch may be rotatable relative to the robot body.

While various embodiments of the invention have been described, the invention is not to be restricted except in light of the attached claims and their equivalents. Moreover, the advantages described herein are not necessarily the only advantages of the invention and it is not necessarily expected that every embodiment of the invention will achieve all of the advantages described.

We claim:

1. A mobile robot, the mobile robot comprising:
a robot body;
a first track located on a first side of the robot body and a second track located on a second side of the robot body, wherein the first track and the second track are configured to cause movement of the robot body relative to a first surface; and
a first crutch, wherein the first crutch includes a crutch arm extending from a magnet base, and wherein the first crutch includes a crutch magnet secured to the magnet base,
wherein the crutch arm is rotatable relative to the robot body about an axis, and
wherein the magnet base is fixed relative to the crutch arm such that the crutch magnet moves when the crutch arm rotates about the axis
wherein the magnet base includes an arced profile that is parallel to a profile formed by a curved portion of the first track, and wherein the crutch magnet moves along the arced profile when the crutch arm rotates.

2. The mobile robot of claim 1, wherein an end of the crutch arm includes a roller configured to contact a second surface, the second surface being angled relative to the first surface.

3. The mobile robot of claim 2, wherein contact between the second surface and the roller causes rotation of the crutch arm about the axis.

4. The mobile robot of claim 1, further comprising a second crutch that is rotatable about the axis.

5. The mobile robot of claim 4, wherein the first crutch is adjacent to the first track, wherein the second crutch is adjacent to the second track, and wherein the first crutch is rotatable relative to the second crutch such that the first crutch and the second crutch are independently operable.

6. The mobile robot of claim 1, wherein the first crutch is located on a front side of the mobile robot, and wherein a second crutch is located on a rear side of the mobile robot.

7. The mobile robot of claim 1, wherein at least one undercarriage magnet is located on a bottom surface of the robot body and fixed relative to the robot body.

8. The mobile robot of claim 1, wherein at least one of the first track and the second track includes a plurality of track magnets included within track linkages.

9. The mobile robot of claim 1, wherein a contact surface of the crutch arm is offset relative to a plane extending through the axis and parallel to the first surface, such that contact between a second surface and the contact surface causes a torque on the crutch arm about the axis.

10. A mobile robot, the mobile robot comprising:
a robot body;
a first track located on a first side of the robot body and a second track located on a second side of the robot body, wherein the first track and the second track are configured to cause movement of the robot body relative to a first surface,
wherein the first track includes a plurality of linkages mechanically coupled to an actuator, wherein at least one of the linkages includes a track magnet for causing an attraction between the first track and the first surface; and
a first crutch, wherein the first crutch includes a crutch arm that extends beyond an outer perimeter profile of the first track and includes a magnet base comprising an arced profile that is parallel to a profile formed by a curved portion of the first track.

11. The mobile robot of claim 10, wherein the track magnet is at least partially covered by a magnet enclosure, and wherein a face of the track magnet is depressed relative to an adjacent face surface of the magnet enclosure.

12. The mobile robot of claim 11, wherein the face of the track magnet is exposed on an outer perimeter of the first track.

13. The mobile robot of claim 10, wherein an end of the crutch arm includes a roller configured to contact a second surface, the second surface being angled relative to the first surface.

14. The mobile robot of claim 13, wherein contact between the second surface and the roller causes rotation of the crutch arm relative to the robot body.

15. The mobile robot of claim 10, wherein the first crutch and a second crutch that are rotatable about an axis, wherein the first crutch is adjacent to the first track, wherein the second crutch is adjacent to the second track, and wherein the first crutch is rotatable relative to the second crutch such that the first crutch and the second crutch are independently operable.

16. The mobile robot of claim 10, wherein at least one undercarriage magnet is located on a bottom surface of the robot body.

17. A mobile robot, the mobile robot comprising:
a robot body;
a first track located on a first side of the robot body and a second track located on a second side of the robot body, wherein the first track and the second track are configured to cause movement of the robot body relative to a first surface; and
a first crutch and a second crutch located on a front side of the mobile robot; and
a third crutch and a fourth crutch located on a back side of the mobile robot,
wherein each of the first crutch, the second crutch, the third crutch, and the fourth crutch includes a crutch arm that extends beyond an outer perimeter profile of the first track and the second track; and
wherein at least one of the first crutch and the third crutch comprises a magnet base having an arced profile that is parallel to a profile formed by a curved portion of the first track.

18. The mobile robot of claim 17, wherein each of the first crutch, the second crutch, the third crutch, and the fourth crutch includes at least one crutch magnet that is fixed to the respective crutch arm.

19. The mobile robot of claim 17, wherein each of the first crutch, the second crutch, the third crutch, and the fourth crutch is rotatable relative to the robot body.

\* \* \* \* \*